United States Patent [19]
Knapp

[11] 3,933,204
[45] Jan. 20, 1976

[54] PLUGGING SUBTERRANEAN REGIONS WITH ACRYLIC-EPOXY RESIN-FORMING EMULSIONS

[75] Inventor: Randolph H. Knapp, Houston, Tex.

[73] Assignee: Shell Oil Company, Houston, Tex.

[22] Filed: Oct. 15, 1974

[21] Appl. No.: 514,705

[52] U.S. Cl. ................................. 166/295; 166/250
[51] Int. Cl.² ........................................ E21B 33/138
[58] Field of Search ..................... 166/295, 281, 250

[56] References Cited
UNITED STATES PATENTS

| | | | |
|---|---|---|---|
| 2,859,820 | 11/1958 | Trott .................................... | 166/281 |
| 3,176,769 | 4/1965 | Treadway et al. ................... | 166/295 |
| 3,181,612 | 5/1965 | West et al. ........................... | 166/295 |
| 3,282,338 | 11/1966 | Walther et al. ...................... | 166/295 |
| 3,335,796 | 8/1967 | Parker, Jr. ........................... | 166/295 |
| 3,401,747 | 9/1968 | Copeland et al. .................... | 166/295 |
| 3,587,742 | 6/1971 | Wittenwyler et al. ............... | 166/295 |
| 3,634,237 | 1/1972 | Crenshaw et al. ................... | 166/308 |

*Primary Examiner*—Stephen J. Novosad
*Assistant Examiner*—George A. Suckfield

[57] ABSTRACT

A subterranean region is plugged by flowing into it an aqueous emulsion containing an epoxy-resin-forming polyepoxy polymer, an acrylic-resin-forming polycarboxy polymer, and a material for controlling the rate of the interaction of said polymers, with the proportions of said materials arranged to cause the emulsion to become a resinous plug after being emplaced.

8 Claims, 3 Drawing Figures

PLUGGING SUBTERRANEAN REGIONS WITH ACRYLIC-EPOXY RESIN-FORMING EMULSIONS

BACKGROUND OF THE INVENTION

This invention relates to decreasing the permeability of a subterranean region, such as a region in or around a permeable earth formation that is encountered by the borehole of a well.

The need for decreasing the permeability of various subterranean regions has long been known and numerous processes have been proposed for doing so. For example, U.S. Pat. No. 3,195,630 describes an aqueous solution of urea and a salt of a metal from which a gel is formed; the T. J. Robichaux U.S. Pat. No. 3,308,884 describes an aromatic solvent solution of epoxy amino resin-forming components, which solution subsequently becomes a flow-resistant gel; and the H. J. Sommer, Jr. and W. C. Simpson U.S. Pat. No. 3,324,041 describes an emulsion that contains an asphalt, a polyamide, and a polyepoxy polymer, and subsequently becomes a highly viscous material; etc. The prior processes that are capable of plugging loose sands by converting them to consolidated, compression-resistant plugs tend to be undesirably expensive. The less costly prior processes that form gels or viscous fluids tend to fail in unconsolidated reservoir sands because the plugged portions of the sands are displaced into the well and/or to fail in reservoirs of low permeability because portions of the emulsions are too large to penetrate into the pores of the reservoir.

SUMMARY OF THE INVENTION

The present invention relates to an improvement in a well treating process in which a subterranean permeable region is plugged by flowing into it a pumpable fluid that subsequently becomes immobile. The improvement comprises the following. An aqueous emulsion is compounded so that it contains water, an epoxy-resin-forming polyepoxy polymer, an acrylic-resin-forming polycarboxy polymer and a material for controlling the rate of interaction of the polymers. The proportions of the ingredients are correlated with the temperature and flow properties of the subterranean region to be plugged so that, after being flowed into that region, the emulsion becomes a resinous plug that has a selected amount of compressive strength.

DESCRIPTION OF THE INVENTION

Figure 1:
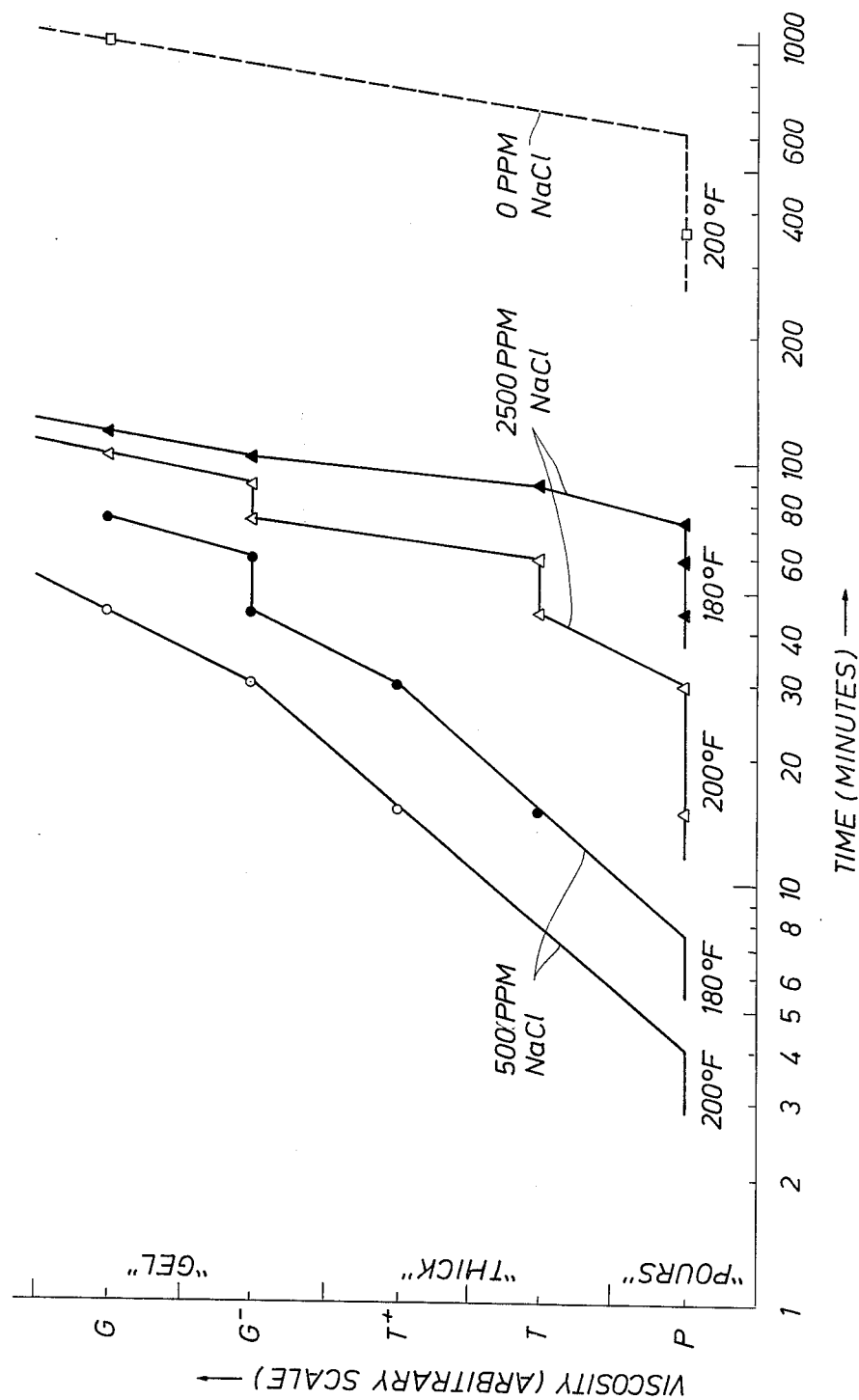
FIGS. 1, 2 and 3 are illustrative of graphs of variations in viscosity with time of various emulsions of the present invention.

The present invention is, at least in part, premised on the discovery that the proportions of the present self-curing emulsions (of water, polyepoxy and polycarboxy resin-forming polymers and reaction rate-controlling material) can be correlated with the temperatures and flow properties of subterranean regions so that the emulsions form resinous plugs having significant amounts of compressive strength after they have been flowed into the regions to be plugged. For example, a mass of loose sand having a permeability of 10 darcys and substantially no compressive strength was so treated to form an impermeable consolidated mass having a relatively high compressive strength, of about 650 pounds per square inch. A tight unconsolidated Brazos River sand core (which had been sieved and remixed to give a 240 md permeability) was so treated and, after gellation of the emulsion in the core, the core permeability was zero and the compressive strength was about 100 psi. Field tests have indicated that a significant compressive strength, preferably at least about 100 psi, is desirable to prevent failure of plugs in unconsolidated reservoir sands. Cores of sands that have been plugged and consolidated by the present process have remained substantially unchanged while being subjected to the action of saturated steam at 340° for more than 5 days.

In the present plugging process a subterranean region can be plugged, without the expense of pre-treatment, by injecting a relatively low-cost emulsion in which the chemical cost is minimized by the absence of organic solvents. In addition, tests have indicated that the resinous plugs formed by the present emulsions do not adhere to metal conduits in a liquid-filled environment, such as a borehole of a well; and, this avoids the expense of cleaning the conduits. However, particularly where the present emulsions contain a water-soluble silane, good bonds are obtained between the cured resins and siliceous sand formations.

An epoxy-resin-forming polyepoxy polymer suitable for use in the present process can comprise substantially any such polymer that contains a plurality of reactive epoxy groups and is adapted to react in the presence of conventional epoxy resin curing agents, to form a cured epoxy resin. Examples of suitable polyepoxides are described in the book "Epoxy Resins" by H. Lee and K. Neville, McGraw-Hill, New York, 1957; in U.S. Pat. No. 2,633,458; etc. Particularly suitable polyepoxy polymers comprise those available as Epon 815 or Epon 828 from Shell Chemical Company or emulsifiable surfactant-containing "epoxies" available as Genepoxy M200, M205, or the TSX-679 Emulsion (50% by weight polyepoxide-in-water emulsion) from General Mills.

Acrylic-resin-forming polycarboxy polymers suitable for use in the present process can comprise substantially any such polymers which contain a plurality of reactive carboxy groups and are adapted to react in the presence of the usual acrylic resin curing agents to form cured acrylic resins. In general, such polymers comprise the lower molecular weight alcohol esters of acrylic or methacrylic acid and/or the partially hydrolized polymers of acrylonitrile or methacrylonitrile. Particularly suitable polycarboxy polymers include those available as Carboset 512, 514H, 525, and the like, from B. F. Goodrich Company, and the low molecular weight styrene-maleic anhydride half-ester polymers available, as SMA 3840A Resin, from ARCO Chemical Company. Other polycarboxy polymers which are suitable and commercially available include the Acrysol and Rhoplex emulsion series from Rohm and Haas Company.

The material for controlling the rate of interaction of the polyepoxy and polycarboxy polymers in the present process can be substantially any material that is compatible with the emulsions of the polymers and is effective in either accelerating or decelerating the rate of the resin-forming reaction. Reaction rate accelerating materials include curing rate accelerators for epoxy resins, such as alkali metal hydroxides, e.g., potassium hydroxide, phenolic compounds, like phenol, resorcinol, amines, e.g., benzylmethylamine, alpha-methybenzyldimethylamine, aminophenolic compounds, e.g., dimethylaminomethyl phenols (available as DMP-10 from Rohm and Haas) or 2,4,6-tri-(dimethylaminomethyl) phenols (available as DMP-30 from Rohm and Haas); alkali metal salts of salicylic acid; polyvalent metal salts of relatively high molecular weight fatty acids, e.g., chromium octoate; the acid salts of polyamines, e.g., tetraethylene tetraacetate; alkali metal salts of halogen acids, e.g., sodium chloride; or alkali metal salts of other acids, e.g., $Na_2SO_4$ and $Na_2CO_3$; or the tri-2-ethylhexoate salt of 2,4,6-tri-(dimethylaminomethyl) phenol (available as Epon Curing Agent D, from Shell Chemical Company). The halide anions, such as those present in water solutions of alkali metal halides, e.g., sodium chloride, have been found to be particularly effective as a reaction rate accelerator.

The polymerization reaction rate controlling material used in this invention can also be one that retards the rate of reaction. The reaction rate retarders generally can comprise ketones, such as acetone; aldehydes, such as cyclohexanone; water that is free of the reaction accelerating solutes silicon compounds such as aminoalkyl silanes capable of reacting with carboxy and/or epoxy groups; or water-thickening materials such as cellouse ethers, polysaccharides, water-soluble gums, dissolved salts of polyvalent metals, e.g., calcium chloride or barium chloride, in concentrations such that the metal ions block some of the carboxy groups of the polymers without precipitating the salts of the polymers, or the like.

Where the water to be used in compounding the emulsion contains relatively small proportions of such polymerization rate-controlling ions, a selected gel time can be obtained by overpowering the effects of such ions with a relatively strong accelerator, such as sodium chloride, or a relatively strong retarder, such as an aminopropyl silane. The relative proportions to use can readily be determined by test-tube tests of such systems containing various proportions.

The proportions of the resin-forming polymers are preferably sufficient to provide enough solids to gel and solidify substantially the total volume occupied by the emulsion. In general, this requires an amount of resin-forming material equivalent to at least about ten parts by weight of resinous solid in 100 parts by weight of emulsion (i.e., 10% by weight). The viscosity of such emulsions increase with increases in polymer concentration. The polymer concentration is preferably kept below about 30% by weight in order to maintain a viscosity of less than about 500 centipoises. In general, both the compressive strength of the solidified mass produced by the emulsion and the rate of the polymerization reaction, (at a given temperature and rate controlling material concentration) are increased with increased polymer concentration.

The relative proportions of polyepoxy and polycarboxy polymers can vary from an excess to a deficiency of either relative to the stoichiometric proportions for crosslinking substantially all of the epoxy and carboxy groups. The stoichiometric proportions depend on the acid number of the polycarboxy polymer (i.e., the milligrams of KOH equivalent to each gram of polymer) and the epoxide equivalent weight of the polyepoxy polymer. The compressive strength of the cured resin is generally greatest when the stoichiometric proportions are equal. The preferred weight ratio of polycarboxy polymer to polyepoxy polymer is from about 2 to 3. The order of mixing the polyepoxy and polycarboxy polymers and water can be varied substantially as desired. The reaction rate controlling material (unless it is simply a polymerization reaction rate retardant, such as an electrolyte-free water) is preferably added to an emulsion that contains both polymers just prior to injecting the emulsion into a well.

In treating subterranean regions having temperatures of from about 140° to 200°F., the gel times of the present type of emulsions can readily be varied to range from several days to less than 1 hour after the compounding of the emulsions, by simply varying the concentration of sodium chloride in the aqueous phase of the emulsion. For example, such concentration can range from about 0 to about 5000 parts per million (ppm) for temperatures of from about 180° to 200°F and can be increased to concentrations of at least about 15,000 ppm for temperatures of about 120° to 160°F.

In a preferred procedure for compounding an aqueous emulsion of the present invention for use in a particular subterranean region determinations are made of the temperature and flow properties of the region to be treated. As known to those skilled in the art, such determinations can be made in numerous ways, such as the running of temperature and/or fluid-injectivity logs, correlations with other wells that encounter similar reservoirs, and the like. Where the permeability of the region to be treated is relatively low, the rate at which fluid can be caused to flow into that region is relatively low and the time-temperature exposure of the inflowed fluid (relative to that flowing at a faster rate into a region of the same temperature) is relatively long. Where the region to be treated contains an aqueous solution of electrolytes that might accelerate the rate of reaction, their affects on the gel time can be reduced by preceding the emulsion with a slug of fresh water and/or increasing the viscosity of the emulsion (which reduces the rate of diffusion of the electrolytes into the emulsion), or using a relatively low proportion of, or low activity of, reaction rate accelerator, or increasing the proportion of reaction rate decelerating material, etc., in order to provide an emulsion that will yield a desired amount of compressive strength without being gelled too soon.

In a preferred embodiment of the present invention, the catalytic (polymerization reaction rate accelerating) effects of commonly encountered anions such as chloride ions, are utilized to enhance the selectivity of the placement of the emulsion-formed plugs within subterranean regions of non-uniform permeability. For example, in a reservoir interval that includes a brine-containing aquifer, that acquifer can be selectively plugged by injecting into the reservoir interval a slug of the present emulsion that (as injected) is relatively slowly reactive at the reservoir temperature and keeping the injected emulsion static within the reservoir interval long enough for gelation to occur in the portions that have contacted and mixed with the halide ions in the brine-containing aquifer. In such a procedure the selectivity of the plugging can be enhanced by injecting a relatively small slug of such an emulsion which is positioned ahead of an inert fluid (such as fresh water) within the well conduits and, after allowing time for the gelation, displacing the unreacted portions of the emulsion away from the well in response to an injection pressure that is too small to displace the gelled portions. Alternatively, in a reservoir interval of non-uniform permeability in which substantially all layers contain an aqueous saline solution (which occurred naturally or was emplaced by injecting a brine), substantially all portions of the reservoir interval can be plugged to substantially the same reduced permeability by relatively slowly injecting an emulsion of the present invention that is relatively slowly reactive at the reservoir temperature. The frontal portion of such an injected emulsion tends to flow into the most permeable layers of the reservoir interval; but, as the emulsion becomes mixed with halide ions, it is relatively quickly gelled, so that it becomes relatively immobile. The later-arriving portions of the emulsion are therefore diverted into the less permeable layers of the interval, where they are subsequently gelled. In such a procedure, the uniformity of the plugging is enhanced by positioning a slug of the emulsion ahead of a relatively inert fluid, maintaining a relatively constant and slow rate of injection until the pressure required to maintain that rate reaches a selected value (less than the fracturing pressure) and then circulating any unreacted portions of the emulsion out of the well through the conduits within the well.

In the emulsions of the present invention, silanes or other silicon compounds which are reactive with either carboxy or epoxy groups, exhibit a threefold function of (a) increasing the bond strength between the resinous plugging materials and sand grains, (b) reducing the rate of the polymerizing (or curing) of the polymers, and (c) reducing the syneresis or shrinking of the polymerizing emulsion. Examples of silanes which can suitably be used include the hydroxy or amino group-containing silanes of the type described in the T. F. Miki U.S. Pat. No. 2,843,560, which relates to silicone-containing polyepoxy polymers that form resins having increased coating and bonding strengths; the silanes described in patent 3,150,116 on forming similar silane-modified epoxy resins from polyepoxy polymers containing a plurality of hydroxyl groups; etc. Suitable silanes for use in the present process include the amino-propyltriethoxy silanes such as the gama-amino-propyl-triethoxy silane that is available from Union Carbide under the trade name Silane A-1100.

In a particularly suitable emulsion compounding procedure, a resin-forming emulsified polycarboxy polymer, such as Carboset 514H, is utilized. Such an acrylic-resin-forming material is available as a polymer-in-water emulsion having a pH of about 7 and containing 40 weight percent polymer. A liquid epoxy-resin-forming polyepoxy polymer, such as Epon 815, can be mixed directly into the acrylic-resin-forming emulsion concentrate or, alternatively, the polyepoxy polymer can be first emulsified with water and nonionic surfactants and then mixed with the polycarboxy polymer emulsion. Particularly suitable surfactants for use in such operations comprise the polyoxyethylene lower alcohol ethers available from Atlas Chemical Company as BRIJ 30 and BRIJ 35 (in a concentration from about 0.5–2 parts per 100 parts by weight of the epoxy resin). Similarly, Span 20/Tween 20 mixtures can be used as surfactants for the emulsification of epoxies. Cellulosic thickeners such as hydroxyetheyl cellulose can be added to act as a protective colloid and improve stability of the emulsions by increasing the viscosity of the water phase. An equally suitable alternative is to use a commercially available epoxy emulsion such as the General Mills Chemical Company product TSX-679. Also, the water emulsifiable epoxies of liquid diglycidyl ethers of bis-phenol A containing the appropriate surfactants, such as the General Mills Chemical Company emulsifiable epoxies Genepoxy M200 or M205 can be used. Although, in the latter cases, high shear mixing equipment such as a colloid mill or a Cowles mixer may be required to make the epoxy emulsion. This is not usually required when the liquid epoxies are mixed directly into the concentrated polycarboxy polymer emulsions such as Carboset 514H, where a simple mixing is usually sufficient to disperse and emulsify the liquid epoxy.

A typical formulation of an emulsion of the present invention is shown in Table I.

TABLE I

| MIXING FORMULATION FOR ACRYLIC/EPOXY EMULSION SYSTEM | | |
|---|---|---|
| Weight Percent | Lb/gal | Volume Percent |

| | Weight Percent | Lb/gal | Volume Percent |
|---|---|---|---|
| Resin Concentrate Emulsion (40 percent solids) | 37.5 | 8.18 | 38.4 |
| Epoxy Emulsion (50 percent solids) | 8.7 | 9.09 | 8.0 |
| Water + NaCl | 53.8 | 8.33+ | 53.6 |
| | 100 | | 100 |

Sand pack plugging tests were conducted with emulsions typified by those of Table I with the proportions of water and sodium chloride adjusted to provide emulsions containing about 20% wt acrylic-resin-forming material. In such tests the emulsions were injected into packs of sand at rates representative of those used in injecting fluids into subterranean reservoir sands. No differences were apparent when the sand packs initially contained substantially fresh or an electrolyte-containing water or brine when the emulsions were injected behind a slug of fresh water. In such tests, an unconsolidated sand pack having a permeability of 10 darcys was consolidated and completely plugged by treatment at 180°F. The compressive strength of the resultant consolidated core was 650 lbs. psi. The boiling of that core in water for two days did not appear to weaken it. The gel or resinous plugs formed by such emulsions were tough, hard but flexible, acrylic epoxy resins and the plugged cores were substantially completely impermeable. A similar core formed by such a procedure was subjected to the action of saturated steam at 340°F and 5½ days and underwent no visible deterioration and maintained a compressive strength of 350 lbs. per square inch.

FIG. 1 shows a graph of the results of a series of test-tube tests of the effect of sodium chloride concentration on emulsion gel time of emulsions containing about 20 wt. percent of acrylic-resin-forming polymers, at temperatures of 180°F and 200°F. The polyepoxy polymer used was Genepoxy TSX-679 and the polycarboxy polymer was Carboset 514H. The emulsion contained about 20% by wt. of the Carboset polymer and 12% by wt. of the Genepoxy emulsion with the balance being water containing the indicated amounts of sodium chloride. The viscosity scale on FIG. 1 is that indicated in Table II.

TABLE II

QUALITATIVE VISCOSITY SCALE USED IN GEL TIME TESTS

| Qualitative Viscosity | Brookfield Viscosity Range (cps) | Comments |
| --- | --- | --- |
| P "pours" | 10 – 5,000 | Test tube wall drains clean |
| T "thick" | 6,500 – 9,000 | Coats test tube wall |
| T+ "thick plus" | 10,500 – 13,000 | Builds meniscus before flow starts |
| G⁻ "gel minus" | 14,000 – 30,000 | Soft gel |
| G "gel" | 30,000 | Immobile gel |

In the tests the emulsions were compounded, placed in capped test tubes and maintained in an oil bath for the indicated times and temperatures. The viscosities of the gelling or interacting emulsions were observed by periodically tipping the test tubes to observe the pouring tendencies of their contents.

The tests shown in FIG. 1 indicate that at 200°F, with no sodium chloride in the system, the gel time was about 10 hours. With the 2500 ppm sodium chloride concentration at the same temperature, the gel time was reduced to 30 minutes. At 180°F with a 2500 ppm sodium chloride concentration the gel time was 75 minutes which, incidently, is about the time-temperature exposure involved in treating a 10,000 foot well into which the fluid can be injected at a rate of about one barrel per minute.

Figure 2:
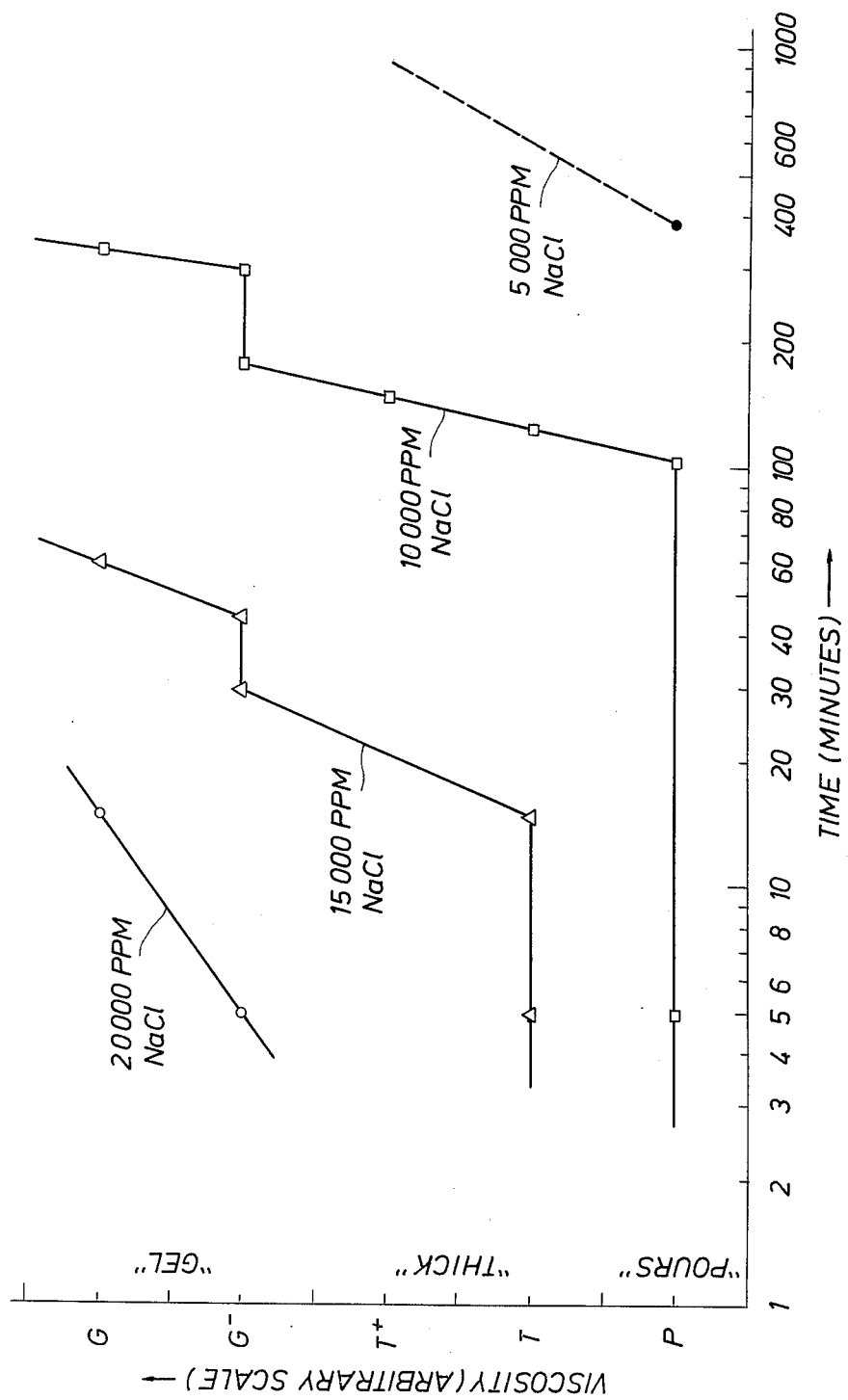

FIG. 2 shows the results of similar tests on an emulsion containing 10% Carboset 514H polycarboxy polymer and 2.9% Epon 815 polyepoxy polymer, with the balance consisting of water containing the indicated amount of sodium chloride. In these tests the temperature was 140°F and the ratio of the weight of polycarboxy polymer to polyepoxy polymer was 3.45. It will be apparent from FIG. 2 that the gel time decreases with increasing chloride ion content. Similar tests at about 20 and 30 weight percent polycarboxy polymer contents indicate that, at lower resin concentrations, long gel times are obtained for a given sodium chloride concentration. For example, at 5,000 ppm sodium chloride in a 10% resin system the gel time was 400 minutes while at the same salt concentration and temperature with a 20% resin content, the gel time was 120 minutes, and with a 30% resin concentration, the emulsion gelled almost immediately.

Figure 3:
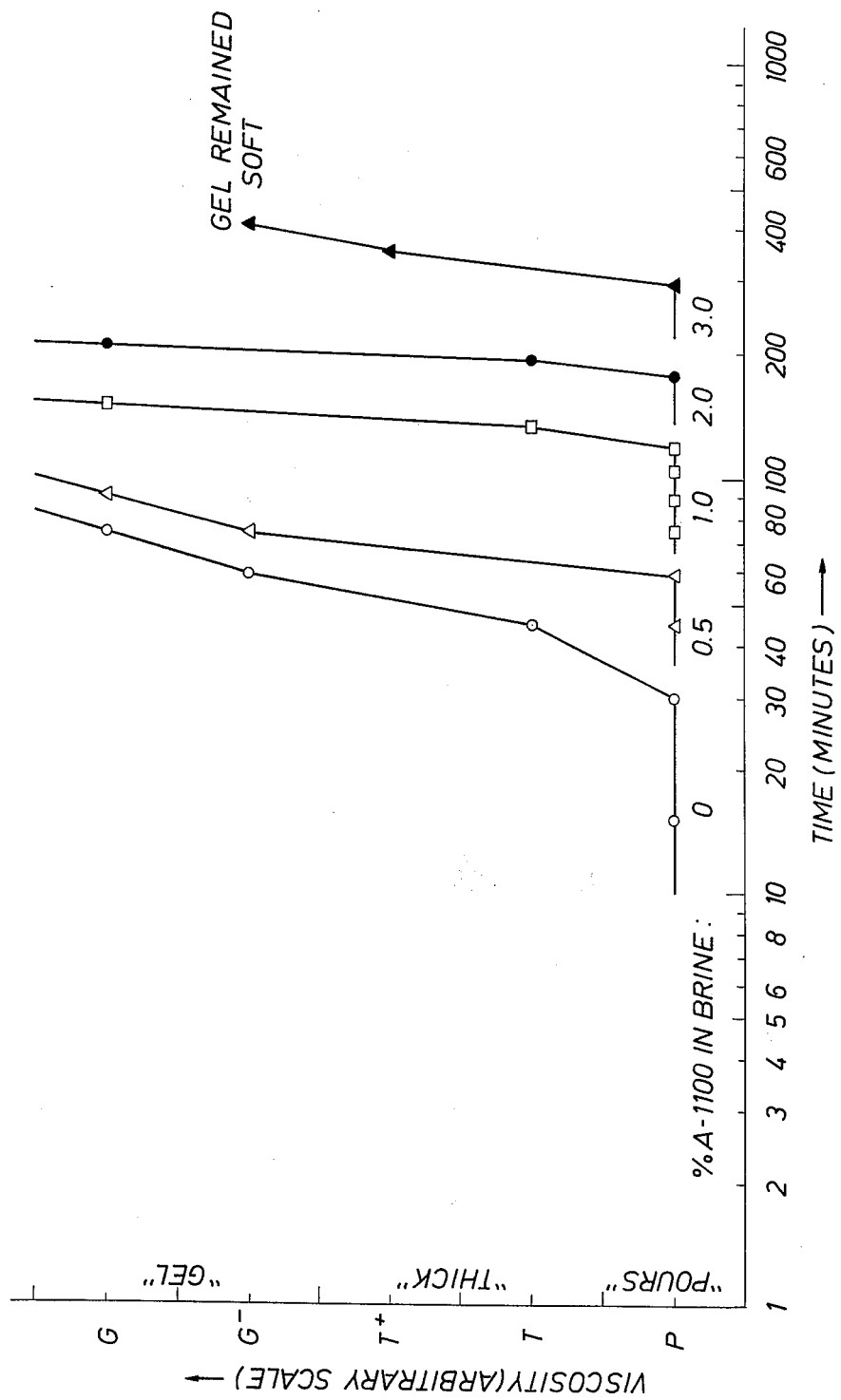

FIG. 3 shows the results of similar tests at 180°F with emulsions containing the indicated amounts of the silane A-1100. The emulsions were compounded in the following way: 81.18 parts by weight of Carboset 514H, resin emulsion (containing 40% polymer) was mixed with 18.82 parts of Epon TXS-679 emulsion (50% polymer), to form 100 parts of emulsion concentrate. Then 61.6 parts of weight by the emulsion concentrate were mixed with 38.4 parts by weight of brine comprising an aqueous solution of 7292 ppm sodium chloride and the indicated proportions of the silane A-1100. This provided 100 parts of the tested emulsion (which contained 2800 parts per million sodium chloride). It will be apparent from FIG. 3 that the gel time at a given sodium chloride concentration can be varied by varying the concentration of a silane such as A-1100. In general, it may be preferable to use such silanes in concentrations of less than about 1% by weight of the emulsion since, as indicated in the tests with 3% A-1100 in the brine (a weight percent of 1.15% of the emulsion), the gel tends to remain soft, rather than to become a firm solid having a significant compressive strength.

The emulsions of the present invention can advantageously contain an emulsified asphalt. The resulting asphalt/resin emulsion gels tend to retain a significant proportion of water, evidently bound in the polymer matrix that is formed by the crosslinking polymerization. The polycarboxy-polyepoxy crosslinking reactions of the asphalt-containing emulsions of the present invention have relatively long gel times compared to the asphalt epoxy emulsions of the W. C. Simpson U.S. Pat. No. 3,324,041. The gel times of the present asphalt resin emulsions can be shortened to substantially any desired times by the addition of a rate-controlling agent such as sodium chloride. The use of asphalt in the present emulsions has the advantage of extending the nonaqueous phase with a relatively inexpensive hydrocarbon material. The asphalt properties such as penetration grade or softening point can be adjusted to control the depth of penetration of the asphalt-containing emulsion into porous matrix formation rock; which provides a system for effecting the shallow plugging then perforating profile control of the J. H. Thommer U.S. Pat. No. 3,830,299. The present asphalt/polycarboxy/polyepoxy polymer emulsions can be manufactured in a variety of ways. For instance, in one test, a Carboset 514H acrylic resin was circulated through a colloid mill at 190°F. Molten asphalt was then added and circulated through the collid mill and a stable asphalt/resin emulsion was obtained containing 25 wt. percent asphalt, 25 wt. percent resin and 50 wt. percent water. This asphalt/resin emulsion was later diluted with water and NaCl to a formulation similar to those previously described and then mixed with the appropriate amount of TSX-679 emulsion (polyepoxy polymer). The gel time was essentially that obtained with asphalt-free emulsions containing the same concentrations of polycarboxy, polyepoxy polymers and sodium chloride. In general, the asphalt concentration should be significant but less than that of the total proportion of the resin-forming polymers, e.g., from about 10–50% of the total weight of mixed acrylic-resin-forming polycarboxy and epoxy-resin-forming polyepoxy polymers.

Since the polycarboxy resin acted as the emulsifier for the asphalt in the above-described process, it is clear to those knowledgeable in the art that another method of manufacture of the asphalt/resin emulsion is to melt and mix the asphalt and resin together prior to emulsification. This molten hydrocarbon is then fed to a colloid mill simultaneously with a hot aqueous phase containing an inorganic base such as NaOH, NH$_4$OH, KOH or organic bases standardly used to make anionic emulsions such as triethanol amine, morpholine, lauryl amine or other fatty amines which form salts with carboxylic acids.

Another method of manufacture involves mixing a previously manufactured asphalt emulsion with the polycarboxy resin emulsion. This is a particularly appropriate method of manufacture when the properties and emulsification technique of the asphalt emulsion have been adjusted to give the desired shallow plugging for profile control as described in the J. H. Thommer patent. The asphalt/resin emulsion then acts as the reactive crosslinking part of the system to provide a filtercake-bonding or fracture-filling gel.

The asphalt (or bituminous materials) used in the present invention can be substantially any such pyrogeneous distillate or tars composed mainly of hydrocarbons with small amounts of sulphur, nitrogen, oxygen or the like substituents. Such materials can include the bituminous materials described in Abrams Asphalt and Allied Substances, Volume 1, page 57, Fifth Edition. Particularly suitable materials are straight run asphalts having penetration values of from about 40 to 300 and softening points in the range from about 95° to 145°F. Asphalt cutbacks such as a 150 penetration grade asphalt cut with 5 to 20% diesel oil, or other oil solvent, are particularly suitable.

What is claimed is:

1. In a well treating process in which a subterranean region is plugged by flowing into it a pumpable fluid that subsequently becomes relatively immobile, the improvement which comprises:
   compounding an aqueous emulsion that contains an epoxy-resin-forming polyepoxy polymer, an acrylic-resin-forming polycarboxy polymer, and a material for controlling the rate of the polymerization of said polymers; and
   correlating the proportions of said polymers and polymerization rate-controlling material with the temperature and flow properties of the subterranean region to be plugged so that, after being flowed into said region, the emulsion becomes a resinous plug having a significant compressive strength.

2. The process of claim 1 in which the proportions of the ingredients are adjusted so that, in an unconsolidated reservoir sand, the emulsion is capable of forming a plugged mass having a compressive strength of at least about 100 pounds per square inch.

3. The process of claim 1 in which said emulsion contains an organic silane that is capable of reacting with epoxy or carboxy groups.

4. The process of claim 1 in which said emulsion contains a proportion of asphalt that is significant but is less than that of the total proportion of the resin-forming polymers.

5. The process of claim 1 in which the material for controlling the rate of interaction between the polymers includes a water-soluble alkali metal halide.

6. The process of claim 5 in which the alkali metal halide is sodium chloride.

7. The process of claim 1 in which:
   the proportions of the polymers and polymerization rate-controlling ingredients are adjusted to provide an emulsion that is slowly reactive at the temperature of the subterranean region; and
   a slug of the emulsion is flowed into the region and kept static long enough for gelation to occur in any portions that have become mixed with aqueous alkali metal halide solution which is encountered within any portion of the region.

8. The process of claim 1 in which:
   the proportion of said polymers and polymerization ratecontrolling ingredients are adjusted to provide an emulsion that is slowly reactive at the temperature of said subterranean region; and
   said emulsion is injected relatively slowly so that, when a first arriving portion of the emulsion flows into a relatively permeable portion of the subterranean region that contains an aqueous solution of an alkali metal halides, that portion of the emulsion is gelled and tends to cause later arriving portions of the emulsion to be diverted into the less permeable portions of the subterranean region.

* * * * *

UNITED STATES PATENT OFFICE
CERTIFICATE OF CORRECTION

PATENT NO. : 3,933,204
DATED : January 20, 1976
INVENTOR(S) : RANDOLPH H. KNAPP and SAM G. ALMQUIST It is certified that error appears in the above-identified patent and that said Letters Patent are hereby corrected as shown below:

The inventorship should read as follows:

"Inventors: Randolph H. Knapp and
Sam G. Almquist, Houston, Texas"

Signed and Sealed this fifteenth Day of June 1976

[SEAL]

Attest:

RUTH C. MASON
*Attesting Officer*

C. MARSHALL DANN
*Commissioner of Patents and Trademarks*